Oct. 1, 1963   O. A. VIELI   3,105,745
APPARATUS FOR THE PRODUCTION OF SYNTHETIC RESIN FOAM
Filed May 2, 1960   2 Sheets-Sheet 1
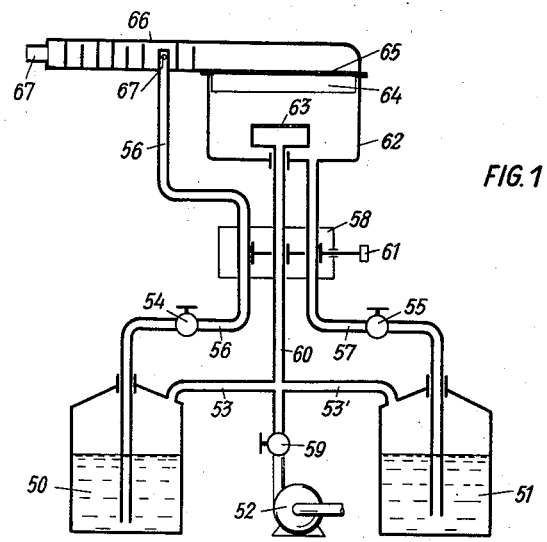
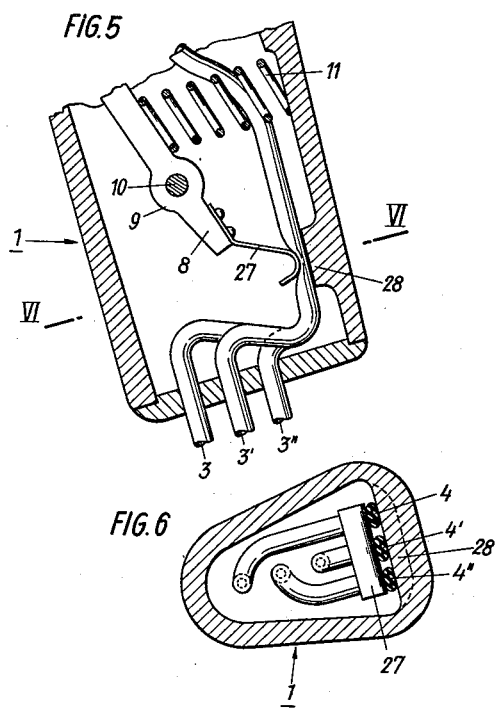
INVENTOR:
Otto Anton Vieli
BY
HIS ATTORNEY.

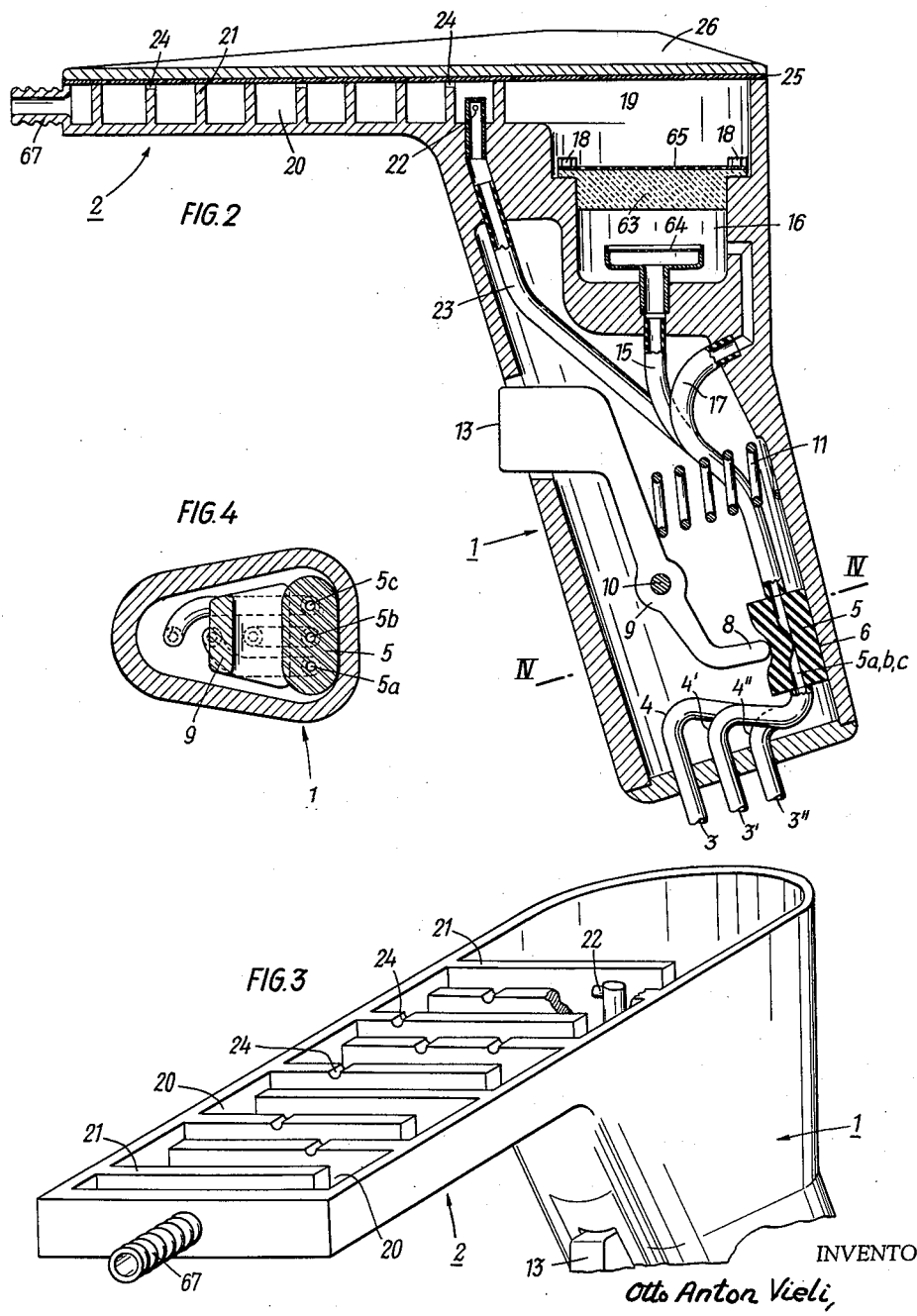

United States Patent Office 3,105,745
Patented Oct. 1, 1963

3,105,745
APPARATUS FOR THE PRODUCTION OF
SYNTHETIC RESIN FOAM
Otto Anton Vieli, Rhaezuens, Grisons, Switzerland
Filed May 2, 1960, Ser. No. 26,377
Claims priority, application Switzerland Apr. 30, 1959
2 Claims. (Cl. 23—252)

The present invention relates to an apparatus for the production of synthetic resin foam from a synthetic resin formed by two components, a foaming agent and pressurized air or any other pressurized gas for pneumatically forming the foaming agent.

In devices of this kind, the resin solution, being the first component, is pneumatically foamed up together with the foaming agent, the foam thus produced being transformed to a fine foam having the desired pore size and afterwards thoroughly mixed with the hardening agent being the second component, whereby the foam is first gelled and then hardened. The known devices of this type are rather complicated and have extensive dimensions and rather high weight. They comprise for instance rotating, mixing and beating members which, on the one hand, transform the coarse foam produced by pneumatic means into a fine foam and which, on the other hand, mix the foam thus produced with the hardening agent or the second component, respectively. As it is inevitable that the hardening process sets in already in the foam generator and that hardened foam particles stick on the mixing members, which fact requires the periodical cleaning of the rotating members, it can be easily seen that such devices work rather uneconomically due to the long periods of interruption between the actual working periods.

With the existing devices for producing synthetic resin foam it is furthermore necessary to operate three valves at the beginning of the foam production, viz. the valve for the pressurized air, the valve for the one resin component e.g. the hardening agent, and the valve for the supply of a mixture consisting of the foaming agent and the second resin component e.g. the resin solution. In the foam production a relatively narrow ratio between these three values must be adhered to. In case of any deviation from this ratio a faulty unusable foam will result. When such devices are set in operation, all of the three valves must be adjusted in such a manner as to produce satisfactory foam. As a relatively long period of time, e.g. one minute, lapses until a variation of the setting of a valve will show its effect in the foam produced, it is rather difficult and means a loss of time and material to adjust such a device of the known type.

It is one object of the present invention to provide an apparatus for producing a synthetic resin foam which can easily be set in operation, which comprises no mechanically moved parts and which guarantees a thorough mixing of the components to be mixed.

Nowadays one way of use of foamed synthetic resins consists in its application for the purpose of sound and heat insulation of rooms whereby the foam is directly injected into the hollow walls confining such rooms, in situ. With the devices which have become known up till now for the production of synthetic resin foam, the carrying out of this process is rather difficult.

It is thus another object of the present invention to provide an apparatus for the production of synthetic resin foam which device is easy to handle and of very low weight so that it can be held and handled without any difficulty by one hand only.

The apparatus for the production of synthetic resin foam according to the present invention from a foaming agent, the two components of a resin and a pressurized gas comprises a pneumatic generator for coarse foam in which the foaming agent, mixed with one resin component, is foamed up by the pressurized gas, and a mixing device connected to this pneumatic foam generator and serving for mixing the foam with the second component.

According to the present invention an apparatus of this type is constructed in such a manner that one supply line each is provided for supplying the pressurized gas, for supplying the mixture of the one resin component with the foaming agent and for supplying the second resin component, a single shut-off device being provided for all of these three lines, said shut-off device enabling or interrupting, respectively, the flow in all of these three lines simultaneously. By this arrangement an extremely simple means of controlling the flow in the three individual lines is provided. It is possible to simultaneously control the flow in all of these three lines by a single manual operation.

According to one embodiment of the present invention the lines consist of resilient material, the shut-off device being formed by a clamping device acting on the lines.

A preferred embodiment of the apparatus according to the present invention is characterized by the fact that the three lines extend through an element of resilient material provided with three channels, which element is compressed by spring action, a manually operated device being provided for biasing the spring force.

In a further embodiment of the apparatus according to the present invention the shut-off device is formed by three spring leaves shutting off and opening, respectively, the passage cross-section of the three lines being formed from resilient material, said spring leaves being operated by a single operating means, e.g. a lever.

The apparatus according to the present invention is suitably of gun-shape, the barrel part of the gun comprising the mixing device and the grip part of the gun comprising the shut-off device. The mixing device is suitably of labyrinth-shape and rigidly connected to the pneumatic foam generator, a frit of porous material being provided between the coarse foam generator and the labyrinth, for refining the foam. The labyrinth may be formed by meandering channel-sections, openings being suitably provided in the intermediate walls between two adjacent channel-sections for mixing the foam flowing through. In order to facilitate the cleaning of the mixing device, an arrangement is made in such a manner that the channel-sections are in one plane and covered by a removable lid. The second resin component is admixed to the foam produced in the foaming device by means of a nozzle provided in the first third of the labyrinth-shaped mixing device, when looking in the direction of the flow of foam.

Various exemplary embodiments of the present invention are shown in the accompanying drawings.

FIG. 1 of the drawing shows the overall arrangement and working of an installation for the production of synthetic resin foam in which use is made of the apparatus according to the present invention.

FIG. 2 is a longitudinal section of an exemplary embodiment of the apparatus according to the present invention.

FIG. 3 is a perspective partial view of the apparatus shown in FIG. 2.

FIG. 4 is a section along line IV—IV of FIG. 2.

FIG. 5 is a longitudinal section of another embodiment of the shut-off device shown in the lower part of FIG. 2; and FIG. 6 is a section along line VI—VI of FIG. 5.

Reference is first made to the overall ararngement shown in FIG. 1. The hardening agent, e.g. sulfurous acid, being the one component of the synthetic resin, is contained in a vessel 50 while a second vessel 51 contains a mixture consisting of a foaming agent, e.g. an alcohol sulfonate, and a synthetic resin, f.i. an aqueous urea-formaldehyde resin solution as the second synthetic resin component. The liquids contained in vessels 50, 51 are pressurized by means of a pump 52 via lines 53 and 53' in such a manner that they reach via valves 54 and 55 and lines 56 and 57 the shut-off device, diagrammatically shown in FIG. 1 and designated therein by the numeral 58. A shut-off device 59 is provided behind the air pump 52. By means of the latter shut-off device the supply of air to lines 53, 53' and to a line 60 can be controlled. The line 60 serves for the supply of compressed air or any other gas pressurized by the pump 52. The shut-off device 58 allows for the simultaneous opening and closing, respectively, of all of the three lines 56, 57 and 60, a single operation of the handle 61 of the shut-off device 58 being required therefore only.

Lines 57 and 60 terminate in a coarse foam generator 62, the end of line 60 being provided with a perforated plate 63. In the coarse foam generator 62, a mixture, consisting of foaming agent and resin solution, which is fed through line 57 is foamed up by means of the air which is pressed through the openings of the perforated plate 63. The coarse foam thus produced penetrates a frit 64 consisting of porous material which frit together with a second perforated plate 65 forms the fine foam generator. The coarse foam produced in the coarse foam generator 62, when penetrating the frit 64 and the perforated plate 65, is transformed into a fine-cell foam. This fine-cell foam enters a mixing device 66 into which enters a nozzle 67 of the line 56 for the supply of the hardening agent. In the mixing device 66 the fine foam is thoroughly mixed with the hardening solution whereupon it is discharged through the discharge opening 67.

Alternatively, the vessel 50 can contain the resin solution while the vessel 51 contains the mixture of foaming agent and hardening agent.

During operation, after the ratio required for the production of a foam of suitable structure and quality has been adjusted once by means of the valves 54 and 55, the foam production can be started or interrupted by simple operation of the handle 61. When operating this handle which, simultaneously, acts on all three of the lines 56, 57 and 60, ready-for-use foam will be discharged through opening 67 after a few seconds and practically without any rejects. The coarse foam generator 62, the fine foam generator and the mixing device 66 are combined to one single part which is very easy to handle. Lines 56, 57 and 60 may be formed by hoses the length of these lines being chosen according to requirements.

FIG. 2 shows an exemplary embodiment of the upper part of the entire installation shown in FIG. 1. The apparatus for the production of synthetic resin foam shown in FIG. 2 has the shape of a gun which comprises a grip or control part 1 and a horizontal part 2 which corresponds to the barrel of the gun. The lower part of the grip is provided with three inlets 3, 3', 3" for the pressurized gas, the component of the resin which is mixed with foaming agent solution, and the second component of the resin. The inlets 3, 3' and 3" are connected by means of lines 4, 4', 4" to a body 5 of resilient material which is provided with three axial bores 5a, 5b, 5c arranged adjacent to each other, and, if required, two restricted portions at 6 and 7 which are located at opposite sides of the body 5 and which are not shown in the drawing. With the restriction at 6 the resilient body 5 abuts on a projection of corresponding shape at the inner walls of the grip 1 while the one end 8 of a lever 9 engages with the recess 7. The lever 9 which is pivoted at 10 is acted upon by a spring 11 in such a manner that the end 8 of the lever compresses the resilient body 5 whereby the three lines are shut off. The other end 13 of the lever 9 projects through the front side of the grip 1 in such a manner that it can easily be pivoted against the tension of spring 11 whereby the body 5 is relieved and the lines extending through this body are opened.

Above the lever 9 and the spring 11 is a pneumatic coarse foam generator which corresponds to the coarse foam generator designated by numeral 62 in FIG. 1. It consists of a first perforated plate 63 below which terminates line 15 leading up from the resilient body 5 and conveying the pressurized gas. A second line 17 terminates in the space 16 in which the perforated plate 63 is located, said line 17 supplying that component of the resin which is mixed with the foaming agent. Most of the space 16 is filled during operation with the foaming agent solution and the one resin component so that coarse foam is produced when air enters through the perforated plate 63. The space 16 is enclosed towards the top by means of a frit 64 which is supported by a second perforated plate 65 which is removably connected by screws 18. The frit 64 may be formed by any porous material e.g. by a sponge material having fine pores so that the structure of the foam penetrating through this frit is refined. The perforated plate 65 merely serves for the abutment of the frit 64. The foam which has penetrated through the frit 64 enters a space 19. When entering space 19 the foam has already its final and desired fine structure. It is, however, still under relatively high pressure. At momentary release of this pressure the individual foam lamellae and the foam bubbles, respectively, would be destroyed. A gradual pressure relief of the foam is therefore required, the foam being mixed during this pressure relief with the second component, e.g. the hardening agent for hardening the foam. Furthermore, care has to be taken during the pressure relief that the hardening agent is intimately mixed with the foam.

For the pressure relief and the mixing action a labyrinth is provided in the horizontal part 2 of the apparatus. This labyrinth consists, as is shown in FIG. 3, of meandering channel sections 20, adjacent channel sections being separated from each other by partition walls 21 so that the foam flows along two sides of the partition walls 21 in opposite directions. A nozzle 22 is arranged for instance in the first channel section, which nozzle is connected through a line 23 with the resilient body 5, the second resin component, preferably the hardening agent, being supplied through this line 23.

At the end of the labyrinth the outlet opening 67 for the foam is provided. As is shown in FIG. 3, recesses 24 are provided in the partition walls, said recesses forming by-pass channels for the foam which is conveyed through the labyrinth, and assuring a very intimate mixing of the foam with that component of the resin which is supplied by nozzle 22.

The labyrinth is covered by a gasket 25 and a lid or cover 26. The lid 26 is fastened e.g. by means of a wing nut and set pins not shown in the drawing, or by means of any other easily releasable locking means which allow a thorough cleaning of the channel sections 20 within short time and without any longer interruptions.

FIG. 5 shows an embodiment of the apparatus according to the present invention, in which the three lines 4, 4', 4" are formed of resilient flexible material and in which the one end 8 of the lever 9 is provided with a leaf spring 27 by means of which the lines 4, 4', 4" can be shut off and opened, respectively. At that side of the grip 1 of the gun which is opposite the free end of the leaf spring 27, a projection 28 is provided which serves as a rest for the lines 4, 4', 4". Instead of a single leaf spring three leaf springs can be provided, one spring each acting on one line.

What I claim is:

1. An apparatus, for use in the production of a synthetic resin foam from a foaming agent and from the two components of a synthetic resin required for the production of the resin and from a pressurized gas, comprising a gun-shaped housing including interconnected barrel and grip parts, a pneumatic coarse foam generator disposed in said housing and operable for the foaming up of the foaming agent mixed with one of the resin components, by means of the pressurized gas, a labyrinth mixing device disposed in the barrel part of the gun rigidly connected to the pneumatic coarse foam generator for mixing the foam produced in said coarse foam generator with the second component, a first supply line for the supply of the pressurized gas, a second supply line for the supply of a mixture of said one resin component with the foaming agent, and a third supply line for the supply of the second resin component, said supply lines being formed of resilient material and having each a portion disposed in said grip part of the gun-shaped housing, and a single shut-off device for said three supply lines comprising a manually operated lever clamp disposed in said grip part and acting on all of said portions of the supply lines by spring action simultaneously, whereby said shut-off device, when actuated will interrupt simultaneously the flow in the three supply lines and, respectively, when released will re-establish simultaneously uninterrupted passage at said portions in the three supply lines.

2. An apparatus, as claimed in claim 1, a resilient compressible member defining three internal channels, the portion of each supply line extending through a channel of said member, the spring action of said shut-off device being operable to compress said member for simultaneously interrupting therein the flow in all three channels and thereby in all three supply lines.

References Cited in the file of this patent

UNITED STATES PATENTS

| | | |
|---|---|---|
| 1,686,003 | Hottinger | Oct. 2, 1928 |
| 2,198,585 | Urquhart et al. | Apr. 23, 1940 |
| 2,511,627 | Einbecker | June 13, 1950 |
| 2,802,648 | Christensen et al. | Aug. 13, 1957 |
| 2,894,732 | Taber et al. | July 14, 1959 |
| 3,043,670 | Vieli | July 10, 1962 |